(12) United States Patent
Saad et al.

(10) Patent No.: US 11,640,366 B1
(45) Date of Patent: May 2, 2023

(54) ADDRESS DECODER FOR A MULTI-CHIP SYSTEM

(71) Applicant: Amazon Technologies, Inc., Seattle, WA (US)

(72) Inventors: Dan Saad, Herut (IL); Guy Nakibly, Kedumim (IL); Yaniv Shapira, Beit Yitshak Sha'ar Hefer (IL); Aviv Bonomo, Tel Aviv (IL); Moshe Gutman, Ramat HaShofet (IL)

(73) Assignee: Amazon Technologies, Inc., Seattie, WA (US)

( * ) Notice: Subject to any disclaimer, the term of this patent is extended or adjusted under 35 U.S.C. 154(b) by 0 days.

(21) Appl. No.: 17/457,812

(22) Filed: Dec. 6, 2021

(51) Int. Cl.
*G06F 13/362* (2006.01)
*G06F 13/42* (2006.01)
*G06F 13/40* (2006.01)
*G06F 15/78* (2006.01)
*G06F 9/46* (2006.01)

(52) U.S. Cl.
CPC .......... *G06F 13/4221* (2013.01); *G06F 9/467* (2013.01); *G06F 13/362* (2013.01); *G06F 13/404* (2013.01); *G06F 15/7807* (2013.01)

(58) Field of Classification Search
CPC ............ G06F 15/7807; G06F 15/7832; G06F 15/7867; G06F 15/7871; G06F 15/7896; G06F 13/362; G06F 13/4221; G06F 13/404; G06F 9/467
See application file for complete search history.

(56) References Cited

U.S. PATENT DOCUMENTS

| | | | | |
|---|---|---|---|---|
| 2015/0169495 | A1* | 6/2015 | Zheng | G06F 13/4221 710/315 |
| 2017/0315944 | A1* | 11/2017 | Mayer | G06F 13/24 |
| 2020/0039524 | A1* | 2/2020 | Chu | G07C 5/0808 |
| 2020/0192859 | A1* | 6/2020 | Jones | G06F 13/404 |
| 2020/0264901 | A1* | 8/2020 | Camarota | G06F 9/44505 |

OTHER PUBLICATIONS

U.S. Appl. No. 17/643,127, filed Dec. 7, 2021, Nakibly et al.
U.S. Appl. No. 17/643,572, filed Dec. 9, 2021, Saad et al.

* cited by examiner

*Primary Examiner* — Raymond N Phan
(74) *Attorney, Agent, or Firm* — - Weaver Austin Villeneuve & Sampson LLP

(57) ABSTRACT

An address decoder for a source node in a multi-chip system is disclosed, which can perform parallel decoding steps to determine whether a transaction from the source node is addressed to a target node in a local integrated circuit (IC) or a remote IC, and whether the source node is allowed to access that target node. Based on the outcome of both the decoding steps, the transaction can be either blocked by the address decoder, or routed to the target node. If the transaction is addressed to the remote IC, but the source node is not allowed to access the target node on the remote IC, the transaction can be terminated by the address decoder in the local IC.

20 Claims, 8 Drawing Sheets

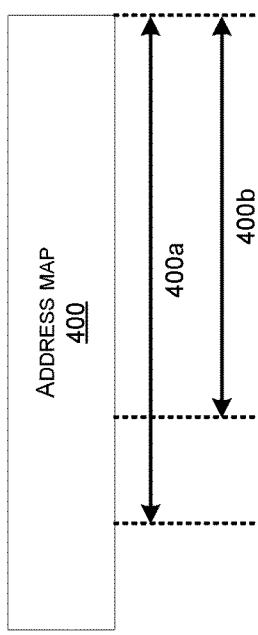
FIG. 4A
FIG. 4B
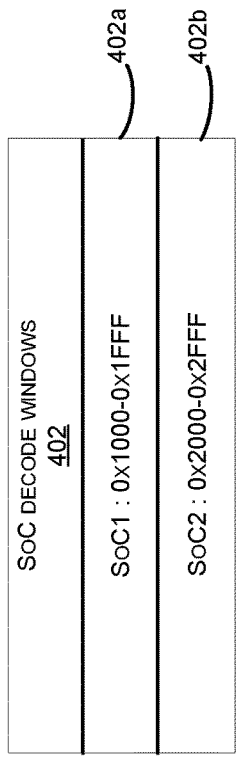
FIG. 4C

| SoC1 ACCESS 604 | SoC2 ACCESS 606 | TARGET NODE DECODE WINDOWS 602 |
|---|---|---|
| ALLOWED | ALLOWED | TARGET NODE1: 0xX000-0xX0FF |
| X | ALLOWED | TARGET NODE2: 0xX100-0xX1FF |
| X | X | TARGET NODE3: 0xX200-0xX2FF |
| ALLOWED | X | TARGET NODE4: 0xX300-0xX3FF |

ADDRESS DECODER FOR A MULTI-CHIP SYSTEM

BACKGROUND

A multi-chip system may include a plurality of integrated circuits such as system-on-chips (SoCs) to support functionalities that demand high performance and compute power such as cloud computing, databases, application hosting, machine learning, among others. The system may include multiple source nodes, which may issue transactions to various target nodes connected via different interconnect fabrics within each IC or across the ICs. Generally, not all the source nodes are allowed to access all the target nodes in the system.

BRIEF DESCRIPTION OF THE DRAWINGS

Various embodiments in accordance with the present disclosure will be described with reference to the drawings, in which:

FIG. 4A illustrate an example address map for an address, according to some embodiments;

FIG. 4B illustrates example SoC decode windows in some embodiments;

FIG. 4C illustrates example target node decode windows in some embodiments;

FIG. 6 illustrates example values for the target node decode windows for the asymmetric multi-chip system, in some embodiments;

DETAILED DESCRIPTION

Figure 1:
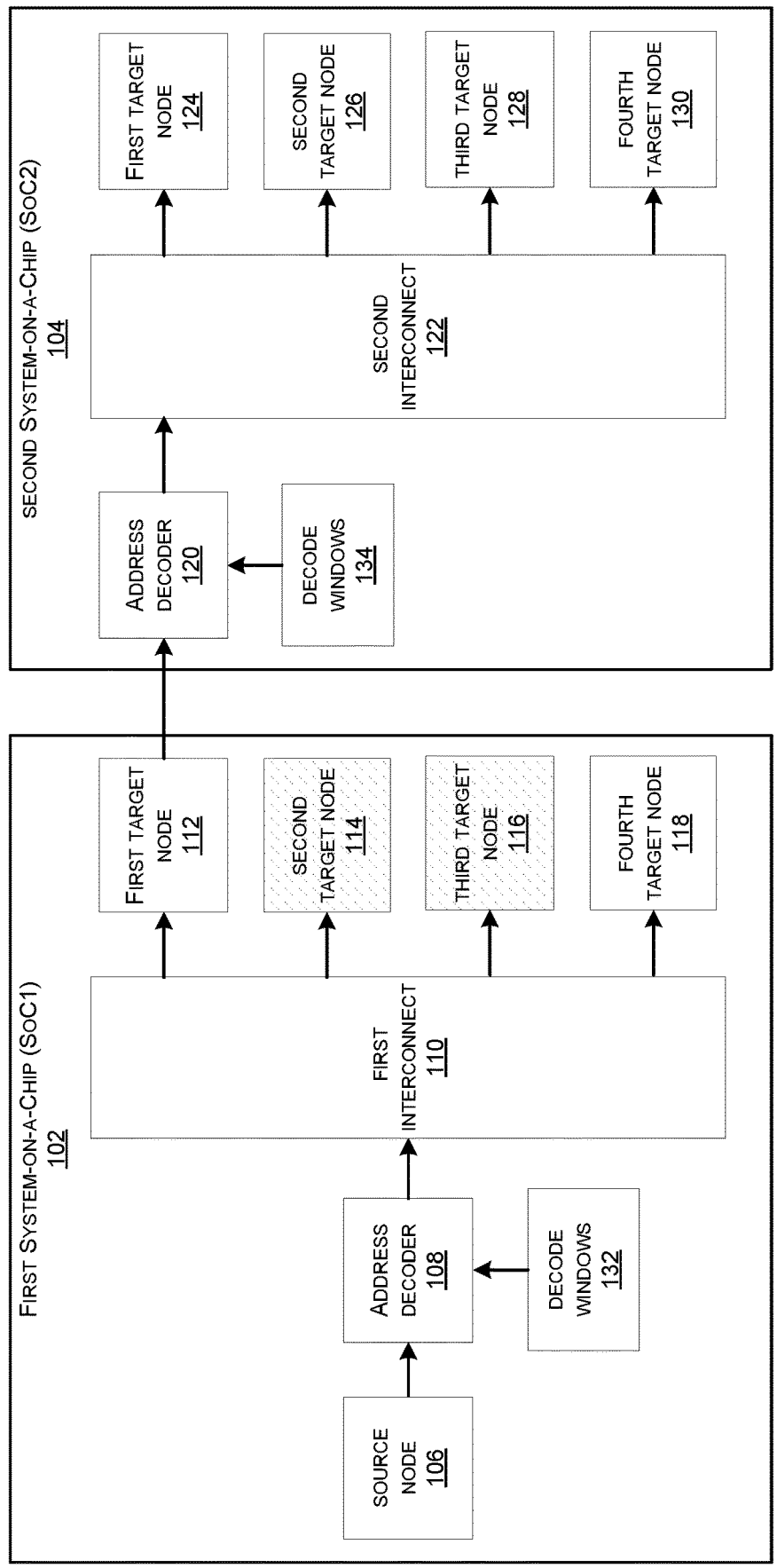
FIG. 1 illustrates a multi-chip system comprising a first system-on-a-chip (SoC) coupled to a second SoC.

A multi-chip system may include a plurality of integrated circuits such as system-on-chips (SoCs) to support functionalities that demand high performance and compute power such as cloud computing, databases, application hosting, machine learning, among others. Each SoC may include multiple source nodes and target nodes, e.g., CPUs, memory (e.g., DRAMs, SRAMs, register files), direct memory access (DMA) controllers, input/output (I/O) devices (e.g., I/O controllers, Peripheral Component Interconnect express (PCIe) devices, network controllers, SATA devices, UARTs, USB devices), or coprocessors (e.g., accelerator engines, crypto engines, graphical processing units (GPUs), audio processors). Various source nodes and target nodes within each SoC and across multiple SoCs may be connected via different interconnect fabrics.

In most cases, all the source nodes on an SoC may not have access to all the target nodes in the local SoC based on the functionality supported by the system, or for security reasons. For example, an I/O device may not have privileges to access certain register files that include system configuration. In a multi-chip system, multiple source nodes on a first SoC may have access to different target nodes on a second SoC (or a remote SoC) through a SoC-to-SoC (S2S) port, which can be used for communications between integrated circuits. As an example, the S2S port may be one of the target nodes in the first SoC, which may operate as a source node on the second SoC. This source node on the second SoC may have access to all the target nodes on the second SoC in order to serve accesses from multiple source nodes on the first SoC.

A transaction issued by a source node on the first SoC, which is addressed to the second SoC, can be forwarded to the second SoC via the S2S port. The transaction arriving at the second SoC via the S2S port may have access to all the target nodes on the second SoC, even though it may not have access to all the target nodes on the first SoC, which can expose the system for attacks and increase the security risks, because this can be used as a mechanism for a source node to access a component that the source node should not be allowed to access. For example, if the source node on the first SoC corresponds to an I/O device, and the target node on the second SoC corresponds to a memory which is storing sensitive data, it may not be desirable for the I/O device to be able to access the memory on the second SoC.

In some systems, each SoC may include a filtering mechanism to block transactions from certain source nodes from other SoCs that do not have privileges to access target nodes on the destination SoC. However, in these instances, the transaction may have to travel through various interconnect fabrics to reach that destination SoC before the transaction can be rejected, which can incur additional system traffic bandwidth and degrade system performance.

Embodiments can be used to control accesses to the target nodes in each integrated circuit (IC) at the source node issuing the transaction. An address decoder for the source node in a local IC can be configured to block or forward a transaction to a target node in a remote IC based on whether the source node is allowed to access that target node in the remote IC. If the source node is not allowed to access the target node in the remote IC, the transaction can be terminated by the address decoder in the local IC. The local IC and the remote IC can each be, for example, a system-on-a-chip (SoC).

The transaction may include a destination address comprising an IC address and a target node address. In some embodiments, a first address decoder coupled to the source node can be configured to perform separate decoding steps simultaneously to determine which IC the transaction is addressed to based on the IC address, and whether the source node is allowed to access a target node based on the target node address. If the transaction is addressed to the second IC, and the source node is allowed to access the target node, the transaction can be forwarded to the S2S port that is coupled to the second IC via a first interconnect. This transaction can be received by a second address decoder in the second IC, which can determine that the transaction is addressed to a local target node in the second IC, and that the source node is allowed to access the target node, and thus forward the transaction to the target node via a second interconnect in the second IC.

If the transaction is addressed to the second IC, but the source node is not allowed to access the target node, the transaction can be terminated at the first IC without sending the transaction to the S2S port. Since the transaction does not have to travel to the remote IC to get rejected, unnecessary traffic can be eliminated to improve system performance. Additionally, controlling the accesses to the target nodes on the remote ICs can close the security gap discussed above, and make the system more robust.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

FIG. 1 illustrates a multi-chip system 100 comprising a first SoC (SoC1) 102 coupled to a second SoC (SoC2) 104. In some implementations, the multi-chip system 100 can have more than two SoCs. The SoC1 102 and the SoC2 104 can also be other types of integrated circuits. The SoC1 102 may include an address decoder 108 coupled to a source node 106, and to a plurality of target nodes via a first interconnect 110. The plurality of target nodes may include a first target node 112, a second target node 114, a third target node 116, and a fourth target node 118. The SoC1 102 can include additional source nodes and/or target nodes not specifically shown. The SoC2 104 may include an address decoder 120 coupled to a plurality of target nodes via a second interconnect 122. The plurality of target nodes may include a first target node 124, a second target node 126, a third target node 128, and a fourth target node 130. The SoC2 104 can include one or more source nodes and/or additional target nodes not specifically shown. In some implementations, the SoC1 102 and the SoC2 104 can have the same architecture and structure.

The source node 106, the target nodes 112-118, and the target nodes 124-130 may include different types of components including CPUs, memory devices, register files, DMA controllers, I/O devices, or coprocessors, among others. In some examples, the SoC1 102 may be coupled to the SoC2 104 via one or more ports. As shown in FIG. 1, the first target node 112 can be a port, or any suitable device that can be configured to allow communication between the SoC1 102 and the SoC2 104 using an interface such as PCIe, QuickPath Interconnect (QPI), Ultra Path Interconnect (UPI), or a proprietary interface. Note that FIG. 1 shows an example implementation of the multi-chip system 100; however, it will be understood that some components of the SoC1 102 and the SoC2 104 may operate as source nodes or as target nodes based on the type of component and/or the type of transaction.

The first interconnect 110 and the second interconnect 122 may be implemented using meshes, rings, crossbars, nodes, switches, bridges, or other suitable components. In some implementations, the first interconnect 110 and the second interconnect 122 may support the Advanced Micro controller Bus Architecture (AMBA) Advanced eXtensible Interface (AXI) protocol, or AXI Coherency Protocol Extension (ACE) protocol for communication between the components.

Generally, a respective address range is allocated to each target node that can be used to access a given target node. The respective range can be used as a decode window by the address decoder to determine if an incoming transaction is directed to one of the target nodes by comparing an address of the transaction with the corresponding decode window. The address decoder can be configured with the decode windows corresponding to each target node. If the address of the transaction lies within one of the decode windows, the transaction can be directed to that target node.

The address decoder 108 can be configured with decode windows 132 comprising a respective decode window for each target node on the SoC1 102, and the address decoder 120 can be configured with decode windows 134 comprising a respective decode window for each target node on the SoC2 104. As shown in FIG. 1, the address decoder 108 can compare an address of a transaction issued by the source node 106 with the decode windows 132 corresponding to the target nodes 112-118, and determine if the transaction is directed to one of the target nodes 112-118. For example, if a portion of the address lies within a decode window corresponding to the first target node 112, the address decoder 108 may determine that the transaction is directed to the first target node 112. The address decoder 108 can generate a transaction node identifier (ID) that can be used by the first interconnect 110 to route the transaction to the first target node 112.

The first target node 112 may be configured to operate as an S2S port between the SoC1 102 and the SoC2 104, and therefore any transactions arriving at the first target node 112 can be received by the address decoder 120. The address decoder 120 can compare the address of the transaction with the decode windows 134 corresponding to the target nodes 124-130, and determine if the transaction is directed to one of the target nodes 124-130. For example, if a portion of the address lies within the decode window corresponding to the first target node 124, the address decoder 120 may determine that the transaction is directed to the first target node 124. The address decoder 120 can generate a transaction node ID that can be used by the second interconnect 122 to route the transaction to the first target node 124.

In some instances, the multi-chip system 100 may operate as a symmetric multi-processing (SMP) system, and therefore, the SoC1 102 and the SoC2 104 may operate in a similar manner. In some implementations, the target nodes 112-118 and the target nodes 124-130 may be mapped to the same corresponding address ranges in each SoC. For example, both the first target node 112 and the first target node 124 may be mapped to a first address range within the respective SoCs, both the second target node 114 and the second target node 126 may be mapped to a second address range within the respective SoCs, both the third target node 116 and the third target node 128 may be mapped to a third address range within the respective SoCs, and both the fourth target node 118 and the fourth target node 130 may be mapped to a fourth address range within the respective SoCs.

In some SMP systems, it may be desirable that the source node 106 has same access privileges on both the SoC1 102 and the SoC2 104. For example, if the source node 106 is allowed to access only the first target node 112 and the fourth target node 118 on the SoC1 102, it may be desirable that the source node 106 has access to only the first target node 124 and the fourth target node 130 on the SoC2 104. As an example, the source node 106 can be a DMA controller, and the target nodes 114-116 on the SoC1 102, and the target nodes 126-128 on the SoC2 104 may include register files storing configuration data, and therefore, the source node 106 may not be allowed to access those register files.

However, in some instances, the source node 106 can gain access to all the target nodes on the SoC2 104 via the S2S port provided by the first target node 112. For example, in order to serve all the source nodes on the SoC1 102, the S2S port may span the entire address space of the SoC2 104 so that different target nodes on the SoC2 104 can be accessible to various source nodes on the SoC1 102. Thus, in this example, even though the source node 106 does not have access to some of the target nodes in the local SoC, e.g., the second target node 114 and the third target node 116 in the SoC1 102, all the target nodes 124-130 on the SoC2 104 may be accessible to the source node 106 via the S2S port, which can increase the security risks. Therefore, when the multi-chip system 100 is configured as the SMP system, if the source node 106 has access to only the first target node 112 and the fourth target node 118 on the SoC1 102, it may be desirable that the source node 106 has access to only the first target node 124 and the fourth target node 130 on the SoC2 104, as well as other SoCs in the system.

Some embodiments can use an address decoder at the source node in a local SoC to perform separate decoding steps to determine whether the source node is allowed to access a target node on the remote SoC. If the source node is not allowed to access the target node on the remote SoC, and the transaction is addressed to the remote SoC, the transaction can be terminated at the local SoC, instead of routing the transaction to the remote SoC. This is further explained with reference to FIG. 2.

Figure 2:
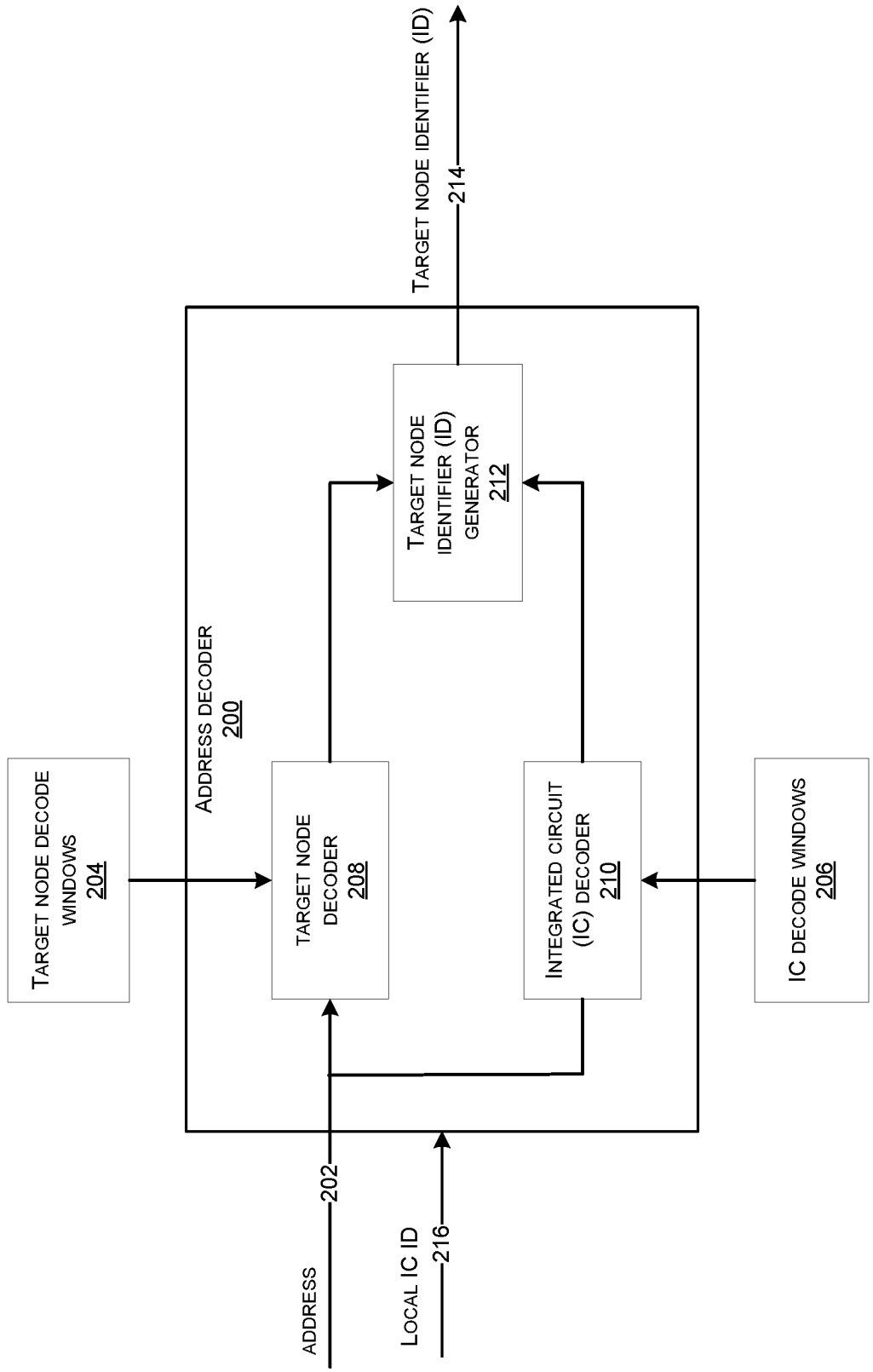
FIG. 2 illustrates an example block diagram of an address decoder comprising separate decoders, according to some embodiments.

FIG. 2 illustrates an example block diagram of an address decoder 200 comprising separate decoders, according to some embodiments. The address decoder 200 can be part of an integrated circuit (IC), e.g., an SoC, in a multi-chip system.

The address decoder 200 may include circuitry for a target node decoder 208, an IC decoder 210, and a target node identifier (ID) generator 212. The address decoder 200 may be configured to receive an address 202 for a transaction comprising a destination address for the target node, and a local IC ID 216 identifying the local IC. The local IC ID 216 can be unique to each IC or SoC in the multi-chip system. The local IC ID 216 can be, for example, hardware generated (e.g., a pre-configured register) or software generated (e.g., an input signal initialized by boot code). The transaction may be issued by the source node 106 in FIG. 1. The destination address may include an IC address and a target node address. For example, a first portion of the address 202 may correspond to an IC, and a second portion of the address may correspond to a target node on that IC. The IC decoder 210 can decode the IC address and the target node decoder 208 can decode the target node address, in parallel, and based on the outcome of both the decoding steps and the local IC ID 216, the transaction can be terminated, or passed to an interconnect coupled to the address decoder 200.

The IC decoder 210 may be configured with IC decode windows 206 comprising a set of IC decode windows corresponding to a set of ICs in a multi-chip system. Each IC decode window for an IC may correspond to an address range allocated to that IC. The IC decoder 210 may be configured to determine whether the IC address of the destination address corresponds to an IC in the set of ICs based on the IC decode windows 206. For example, the IC decoder 210 can determine whether the IC address lies within a decode window of an IC based on the address range allocated to that IC. In some implementations, the IC decoder 210 can generate an IC ID identifying the IC the transaction is addressed to. The IC ID can be compared with the local IC ID 216 to determine if the transaction is addressed to the local IC or a remote IC.

The target node decoder 208 may be configured with target node decode windows 204 comprising a set of target node decode windows corresponding to a set of target nodes. Each target node decode window corresponding to a target node may include a start address of the window, a window size, and an indication of whether the source node is allowed to access that target node for each IC. In some implementations, instead of a start address and a window size, a respective address range can be used for each decode window that has been allocated to the corresponding target node. The target node decoder 208 may be configured to determine whether the source node is allowed to access the target node address of the destination address based on the target node decode windows 204 and the local IC ID 216. For example, the target node decoder 208 can determine whether the target node address lies within a decode window of a target node based on the start address and the window size of that target node, and whether the source node is allowed to access that target node.

The target node ID generator 212 may be configured to generate a target node ID 214 based on the outcome of both the IC decoder 210 and the target node decoder 208, and the local IC ID 216. For example, if the IC decoder 210 determines that the IC address corresponds to a first IC in the set of ICs, and if the target node decoder 208 determines that the target node address corresponds to a first target node that the source node is allowed to access, then the target node ID generator 212 can generate the target node ID 214 associated with the first target node in the first IC. The target node ID 214 can be used by a first interconnect in the first IC to route the transaction to the first target node. Alternatively, if the IC decoder 210 determines that the IC address corresponds to the first IC, and if the target node decoder 208 determines that the target node address corresponds to a second target node that the source node is not allowed to access, then the target node ID generator 212 does not generate the target node ID 214 and the transaction is terminated.

Thus, in various embodiments, the address decoder 200 for a source node in a local IC can be configured to control accesses to the target nodes on a remote IC using separate decoding steps. In some embodiments, each IC can be an SoC in a multi-chip system comprising a plurality of SoCs. This is further explained with reference to FIG. 3.

Figure 3:
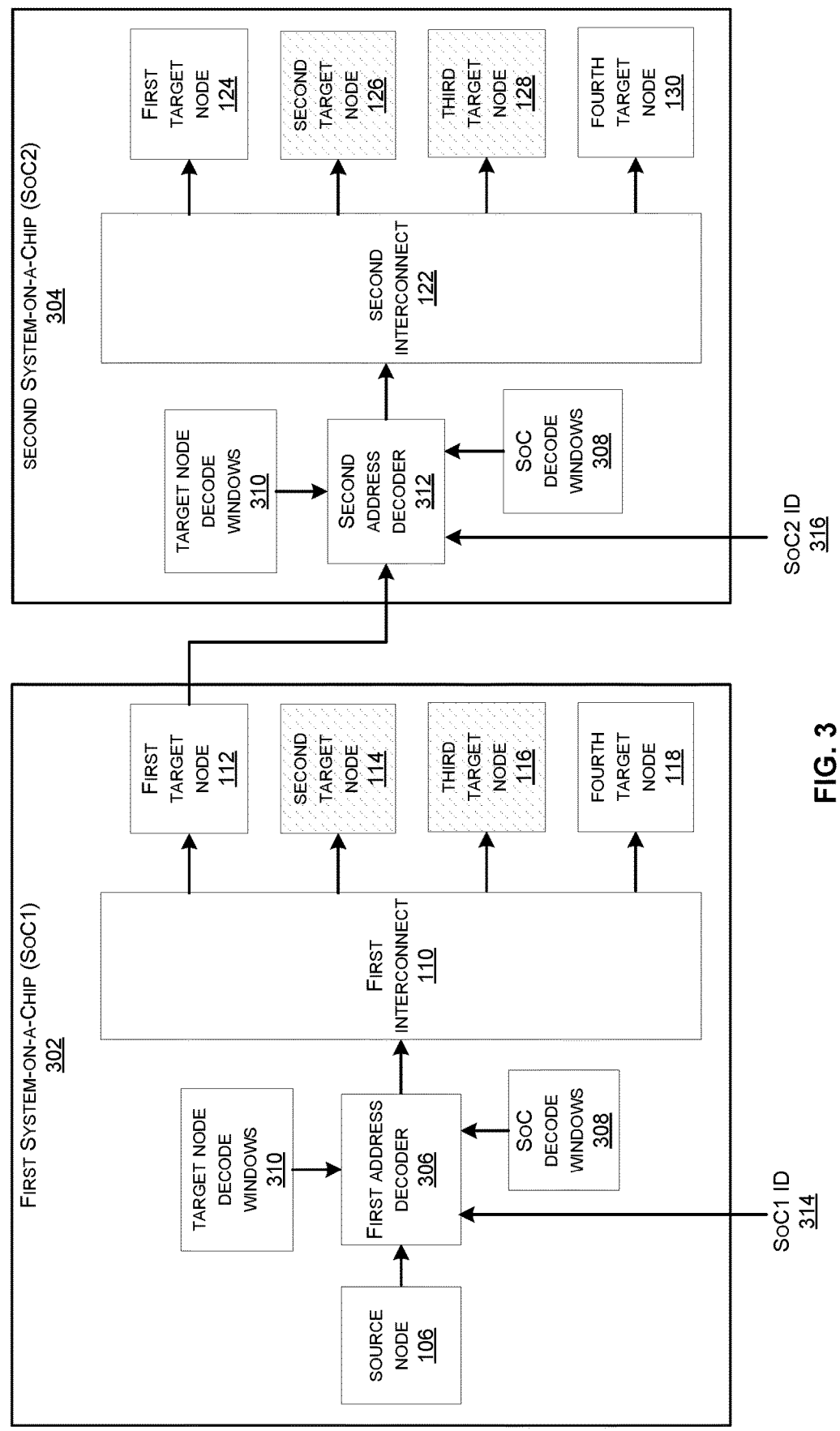
FIG. 3 illustrates a multi-chip system with symmetrical access privileges for a source node on all the SoCs in the multi-chip system, according to some embodiments.

FIG. 3 illustrates a multi-chip system 300 with symmetrical access privileges for the source node 106 on all the SoCs in the multi-chip system, according to some embodiments.

The multi-chip system 300 may include an SoC1 302 and an SoC2 304. The SoC1 302 and the SoC2 304 may include the same source node and the target nodes as discussed with reference to FIG. 1. The SoC1 302 may include a first address decoder 306 coupled to the source node 106 and to the first interconnect 110, and the SoC2 304 may include a second address decoder 312 coupled to the second interconnect 122. The second address decoder 312 may be coupled to the SoC1 302 via the S2S port provided by the first target node 112, as discussed with reference to FIG. 1.

In some embodiments, the multi-chip system 300 may be configured as an SMP system, wherein the source node 106 has same access privileges to a set of target nodes on both the SoC1 302 and the SoC2 304. For example, the source node 106 may be allowed to access the first target node 112 and the fourth target node 118 on the SoC1 302, and the first target node 124 and the fourth target node 130 on the SoC2 304. As an example, the source node 106 can be an I/O device, and the second target node 114 and the second target node 126 may include configuration registers, which the I/O device may not be allowed to access. Similarly, the third target node 116 and the third target node 128 may include memory configured to store sensitive data, which the I/O device may not be allowed to access.

The first address decoder 306 and the second address decoder 312 can be an example of the address decoder 200 discussed with reference to FIG. 2. SoC decode windows 308 and target node decode windows 310 can be an example of the IC decode windows 206 and the target node decode windows 204, respectively, in FIG. 2. In some examples, the SoC decode windows 308 may include an address range allocated to the SoC1 302, and an address range allocated to the SoC2 304. In some implementations, the SoC decode windows 308 may include a start address and a window size allocated to each of the SoC1 302 and the SoC2 304, instead of the address ranges. A SoC1 ID 314 can be used to identify the SoC1 302, and a SoC2 ID 316 can be used to identify the SoC2 304, similar to the IC ID 216 described in FIG. 2. As an example, a value of "1" for the SoC1 ID 314 may identify the SoC1 302, and a value of "2" for the SoC2 ID 316 may identify the SoC2 304. The SoC1 ID 314 and the SoC2 ID 316 can be configured in hardware or software.

The target node decode windows 310 may include a first decode window corresponding to the first target node 112 and the first target node 124, a second decode window corresponding to the second target node 114 and the second target node 126, a third decode window corresponding to the third target node 116 and the third target node 128, and a fourth decode window corresponding to the fourth target node 118 and the fourth target node 130. The target node decode windows 310 may also include a first indication of whether the source node 106 is allowed to access the first target node 112 or the first target node 124, a second indication of whether the source node 106 is allowed to access the second target node 114 or the second target node 126, a third indication of whether the source node 106 is allowed to access the third target node 116 or the third target node 128, and a fourth indication of whether the source node 106 is allowed to access the fourth target node 118 or the fourth target node 130.

In some examples, the source node 106 may issue a transaction that is directed to one of the target nodes in the SoC1 302 or the SoC2 302. The transaction may include an address, data, a source identifier, a destination identifier, controls, and any other relevant information. As an example, the address can be the address 202 shown in FIG. 2.

FIG. 4A illustrate an example address map 400 for an address, according to some embodiments. For example, the address map 400 may correspond to the address 202 comprising a destination address for a transaction.

In some embodiments, the destination address may comprise an SoC address 400a and a target node address 400b. The SoC address 400a can correspond to an address for an SoC in a set of SoCs in the multi-chip system 300, and the target node address 400b can correspond to an address for a target node in a set of target nodes. For example, each target node in the set of target nodes on an SoC may be mapped within the address range allocated to that SoC. An upper portion of the SoC address 400a can be used to identify each SoC in the set of SoCs.

FIGS. 4B-4C illustrate example SoC decode windows and target node decode windows.

FIG. 4B shows an example SoC decode windows 402 comprising a SoC1 decode window 402a and a SoC2 decode window 402b. The SoC decode windows 402 can be an example of the SoC decode windows 308 in FIG. 3. The SoC1 decode window 402a may include an address range 0x1000-0x1FFF allocated to the SoC1 302, and the SoC2 decode window 402b may include an address range 0x2000-0x2FFF allocated to the SoC2 304. In some examples, the destination address can be 16-bits wide, and bits [15:12] of the destination address can be used to identify the SoC, and bits [11:0] of the destination address can be used to identify the target node. For example, a value of 0x1 for the bits [15:12] of the destination address can correspond to the SoC1 302, and a value of 0x2 for the bits [15:12] of the destination address can correspond to the SoC2 304. It should be understood that other implementations may use a different number of address bits.

FIG. 4C illustrates an example target node decode windows 404 that can be an example of the target node decode windows 310 in FIG. 3. The target node decode windows 404 can include a decode window 410a for a target node1, a decode window 410b for a target node2, a decode window 410c for a target node3, and a decode window 410d for a target node4. For example, the decode window 410a may include an address range 0xX000-0xX0FF corresponding to the first target node 112 and the first target node 124, the decode window 410b may include an address range 0xX100-0xX1FF corresponding to the second target node 114 and the second target node 126, the decode window 410c may include an address range 0xX200-0xX2FF corresponding to the third target node 116 and the third target node 128, and the decode window 410d may include an address range 0xX300-0xX3FF corresponding to the fourth target node 118 and the fourth target node 130. Note that for a different source node (not shown) on the SoC1 302, the target node decode windows 404 may include different values for the SoC1 access bit 406 and the SoC2 access bit 408 based on the target nodes that source node is allowed to access on the SoC1 302 and the SoC2 304.

Each target node decode window may also include a SoC1 access bit 406 indicating whether the source node 106 is allowed to access a given target node on the SoC1 302, and a SoC2 access bit 408 indicating whether the source node 106 is allowed to access the given target node on the SoC2 304. For example, for the decode window 410a, the SoC1 access bit 406 may indicate that the source node 106 is allowed to access the first target node 112, and the SoC2 access bit 408 may indicate that the source node 106 is allowed to access the first target node 124. For the decode window 410b, the SoC1 access bit 406 may indicate that the source node 106 is not allowed to access the second target node 114, and the SoC2 access bit 408 may indicate that the source node 106 is not allowed to access the second target node 126. For the decode window 410c, the SoC1 access bit 406 may indicate that the source node 106 is not allowed to access the third target node 116, and the SoC2 access bit 408 may indicate that the source node 106 is not allowed to access the third target node 128. For the decode window 410d, the SoC1 access bit 406 may indicate that the source node 106 is allowed to access the fourth target node 118, and the SoC2 access bit 408 may indicate that the source node 106 is allowed to access the fourth target node 130.

Note that FIG. 4C shows one implementation of storing an indication of whether a source node is allowed to access a target node on each SoC. In some implementations, accesses to each target node can be shown using one access bit per source node of each SoC, instead of one access bit per SoC for each source node. Other implementations are also possible, within the scope of the disclosure.

Referring back to FIG. 3, the first address decoder 306 may receive a transaction from the source node 106 comprising an address. For example, the address can be the address 202 comprising the SoC address 400a and the target node address 400b. The IC decoder 210 of the first address decoder 306 may determine whether the SoC address 400a corresponds to the SoC1 302, or the SoC2 304 by comparing the SoC address 400a with the SoC1 decode window 402a and the SoC2 decode window 402b. Simultaneously, the target node decoder 208 may determine whether the source node 106 is allowed to access the target node address 400*b* by comparing the target node address 400*b* with each of the decode windows 410*a*-410*d*. If the target node address 400*b* corresponds to either the decode window 410*a* or the decode window 410*d*, then the target node decoder 208 may determine that the source node 106 is allowed to access the target node address 400*b*. The target node ID generator 212 can process the outputs of the target node decoder 208 and the IC decoder 210 and generate a target node ID based on the SoC1 ID 314, which can be used by the first interconnect 110 to route the transaction.

As an example, the transaction may be addressed to the first target node 124 on the SoC2 304. Thus, the IC decoder 210 may determine that the SoC address 400*a* corresponds to the SoC2 decode window 402*b*, and the target node decoder 208 may determine that the target node address 400*b* corresponds to the decode window 410*a* for the target node1. Since the source node 106 is allowed to access the target node1 on the SoC2 304 based on the SoC2 access bit 408 and the SoC1 ID 314, the transaction can be sent to the SoC2 304 via the S2S port. Thus, the target node ID generator 212 may generate a target node ID associated with the first target node 112, which can be used by the first interconnect 110 to route the transaction to the first target node 112.

The transaction may be received by the second address decoder 312 via the S2S port. The IC decoder 210 of the second address decoder 312 may determine that the transaction is directed to the SoC2 304, and the target node decoder 208 of the second address decoder 312 may determine that the source node 106 is allowed to access the first target node 124. Thus, the target node ID generator 212 of the second address decoder 312 may generate a target node ID associated with the first target node 124 based on the SoC2 ID 316, which can be used by the second interconnect 122 to route the transaction to the first target node 124.

In another example, if the target node address 400*b* of the transaction corresponds to either the decode window 410*b* or the decode window 410*c*, or does not correspond to any of the decode windows then the target node decoder 208 of the first address decoder 306 may determine that the source node 106 is not allowed to access the target node address 400*b*, and therefore the transaction can be terminated by the first address decoder 306. Thus, the transaction does not need to travel to the SoC2 304 to get rejected, which can eliminate traffic delays caused by routing the transaction to the SoC2 304. Thus, when the source node 106 has same access privileges on both the SoCs, accesses to all the target nodes on both the SoCs can be controlled by the first address decoder 306 coupled to the source node 106, which can close the security gaps discussed with reference to FIG. 1.

Figure 5:
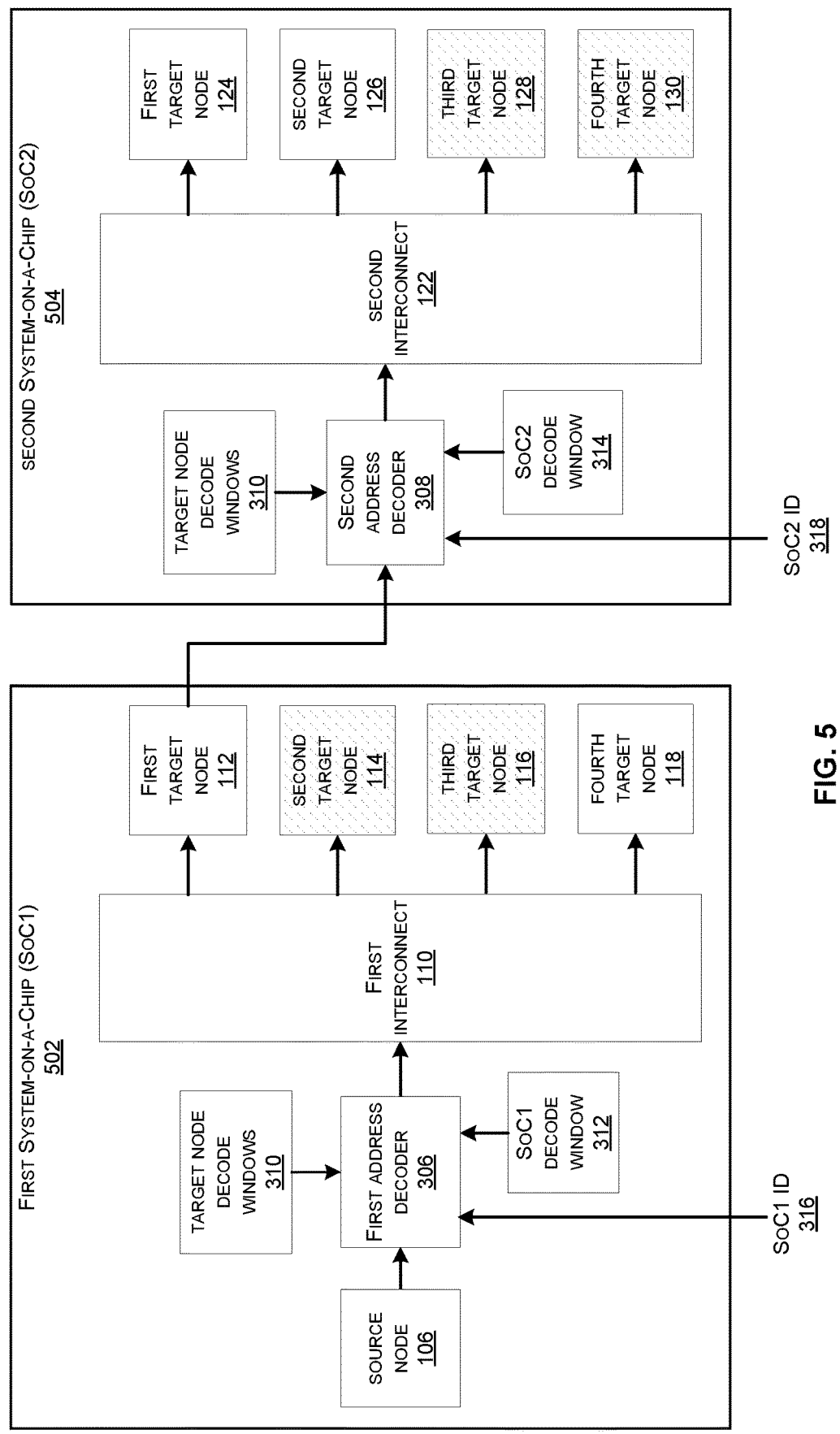
FIG. 5 illustrates a multi-chip system with asymmetrical access privileges for the source node on all the SoCs in the multi-chip system, according to some embodiments.

FIG. 5 illustrates a multi-chip system 500 with asymmetrical access privileges for the source node 106 on all the SoCs in the multi-chip system, according to some embodiments.

The multi-chip system 500 may include an SoC1 502 and an SoC2 504, which can be similar to the SoC1 302 and the SoC2 304, respectively, of the multi-chip system 300; however, the SoC1 502 and the SoC2 504 may have asymmetric access privileges for the source node 106 to access the target nodes on each SoC.

In some examples, the source node 106 may have different access privileges on each of the SoC1 502 and the SoC2 504. For example, the source node 106 may be allowed to access the first target node 112 and the fourth target node 118 on the SoC1 502, and the first target node 124 and the second target node 126 on the SoC2 504. For example, the source node 106 can be a CPU, and the fourth target node 130 can be memory storing sensitive data, which the source node 106 may not be allowed to access. In some embodiments, the target node decode windows can be configured with appropriate values for the SoC1 access bit and the SoC2 access bit, as shown in FIG. 6.

FIG. 6 illustrates example values for the target node decode windows 602, a SoC1 access bit 604, and a SoC2 access bit 606 for the multi-chip system 500 in FIG. 5. For example, for a decode window 600*a*, the SoC1 access bit 604 may indicate that the source node 106 is allowed to access the first target node 112, and the SoC2 access bit 606 may indicate that the source node 106 is allowed to access the first target node 124. For a decode window 600*b*, the SoC1 access bit 604 may indicate that the source node 106 is not allowed to access the second target node 114, and the SoC2 access bit 606 may indicate that the source node 106 is allowed to access the second target node 126. For a decode window 600*c*, the SoC1 access bit 604 may indicate that the source node 106 is not allowed to access the third target node 116 and the SoC2 access bit 606 may indicate that the source node 106 is not allowed to access the third target node 128. For a decode window 600*d*, the SoC1 access bit 604 may indicate that the source node 106 is allowed to access the fourth target node 118, and the SoC2 access bit 606 may indicate that the source node 106 is not allowed to access the fourth target node 130.

In some embodiments, the target nodes 112-118 and the target nodes 124-130 may be mapped to different address ranges within the respective SoCs. In such cases, the target node decode windows 602, the SoC1 access bit 604 and the SoC2 access bit 606 can be configured accordingly to control the access to the target nodes on each SoC. Since the source node 106 may have different access privileges between the SoC1 502 and the SoC2 504, the SoC1 access bit 604 and the SoC2 access bit 606 may be used along with the respective SoC ID to generate the target node ID 214 for each SoC. However, other implementation of using the target node decode windows are possible, without deviating from the scope of the disclosure.

Thus, various embodiments can be used to control the access of a source node in a local SoC to different target nodes on a remote SoC using the address decoder associated with the source node, instead of controlling the access at the remote SoC. Thus, if the source node cannot access a target node on the remote SoC, additional traffic caused by routing the transaction to the remote SoC can be eliminated, which can improve the system performance. Furthermore, by configuring the address decoder with appropriate decode windows, security risks can be minimized.

Figure 7:
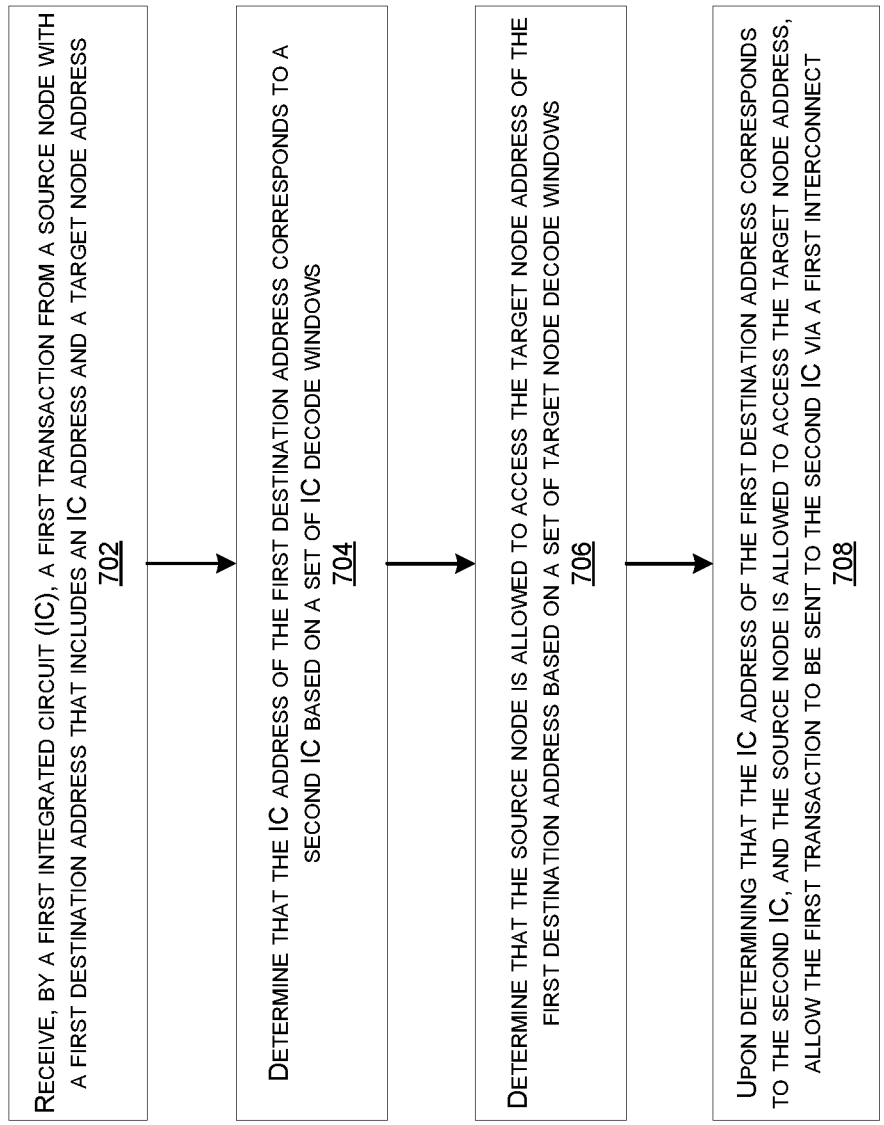
FIG. 7 illustrates a flow chart for a method executed by an address decoder in an SoC, according to some embodiments.

FIG. 7 illustrates a flow chart 700 for a method executed by an address decoder in an SoC or other integrated circuit, according to some embodiments. For example, the method can be executed by the first address decoder 306 in the SoC1 302.

In step 702, the method may include receiving a first transaction from a source node with a first destination address that includes an IC address and a target node address. As discussed with reference to FIG. 3, the first address decoder 306 may receive a first transaction from the source node 106. The first transaction may include a first destination address comprising the SoC address 400*a* and the target node address 400*b*. As an example, the address 202 can be 0x2010 comprising the SoC address 400*a* as 0x2XXX, and the target node address 400*b* as 0xX010.

In step 704, the method may include determining whether the IC address of the first destination address corresponds to a second IC based on a set of IC decode windows. For example, the set of IC decode windows may include the SoC1 decode window 402*a* and the SoC2 decode window 402*b*. The IC decoder 210 may determine whether the SoC address 400*a* of the address 202 corresponds to the SoC1 302, or the SoC2 304. Since the bits [15:12] of the SoC address 400*a* as 0x2XXX have a value of 2, the IC decoder 210 may determine that the IC address corresponds to the SoC2 304, as indicated by the SoC2 decode window 402*b*.

In step 706, the method may include determining that the source node is allowed to access the target node address of the first destination address based on a set of target node decode windows. For example, the set of target node decode windows may include the decode window 410*a*, decode window 410*b*, decode window 410*c*, and the decode window 410*d*. The target node decoder 208 may determine that the target node address with the value 0xX010 corresponds to the target node1 which is allowed for both the SoC1 302 and the SoC2 304, as indicated by the decode window 410*a*, the SoC1 access bit 406, and the SoC2 access bit 408.

In step 708, the method may include upon determining that the IC address of the first destination address corresponds to the second IC, and that the source node is allowed to access the target node address, generating a first target node identifier (ID) to send the first transaction to the second IC via a first interconnect. The first address decoder 306 may determine that the first transaction is addressed to the SoC2 304 based on the determination that the SoC address 400*a* of the first transaction corresponds to the SoC2 304 and not the local SoC as indicated by the SoC1 ID 314, and that the source node 106 is allowed to access the target node address 400*b* of the first transaction. Thus, the target node ID generator 212 may generate a first target node ID associated with the first target node 112, which is configured as the S2S port with the SoC2 304. The first interconnect 110 may use the first target node ID to direct the first transaction to the first target node 112.

The second address decoder 312 may receive the first transaction from the first target node 112, and decode the first destination address of the first transaction. For example, the IC decoder 210 in the second address decoder 312 may determine that the SoC address 400*a* of the first transaction with the value 0x2XXX corresponds to the second SoC as indicated by the SoC2 ID 316, and the target node decoder 208 may determine that the source node 106 is allowed to access the target node address 400*b* of the value 0xX010. The target node ID generator 212 in the second address decoder 312 may generate a second target node ID associated with the first target node 124. The second interconnect 122 may use the second target node ID to direct the first transaction to the first target node 124.

In some examples, a transaction can be blocked by the first address decoder 308 if the transaction is addressed to a target node on the SoC2 304, which the source node 106 is not allowed to access. For example, if the address 202 of a second transaction is 0x2110, the SoC address 400*a* can be 0x2XXX, and the target node address 400*b* can be 0xX110. Since the bits [15:12] of the SoC address 400*a* as 0x2XXX have a value of 1, the SoC decoder 210 may determine that the SoC address 400*a* corresponds to the SoC2 304. The target node decoder 208 may determine that the target node address 400*b* of the value 0xX110 corresponds to the target node2, which is not allowed for both the SoC1 302 and the SoC2 304, as indicated by the decode window 410*b*. Thus, the target node ID generator 212 may not generate a target node ID, and the second transaction may be terminated instead of directing the second transaction to the first target node 112 to be sent to the SoC2 304.

Figure 8:
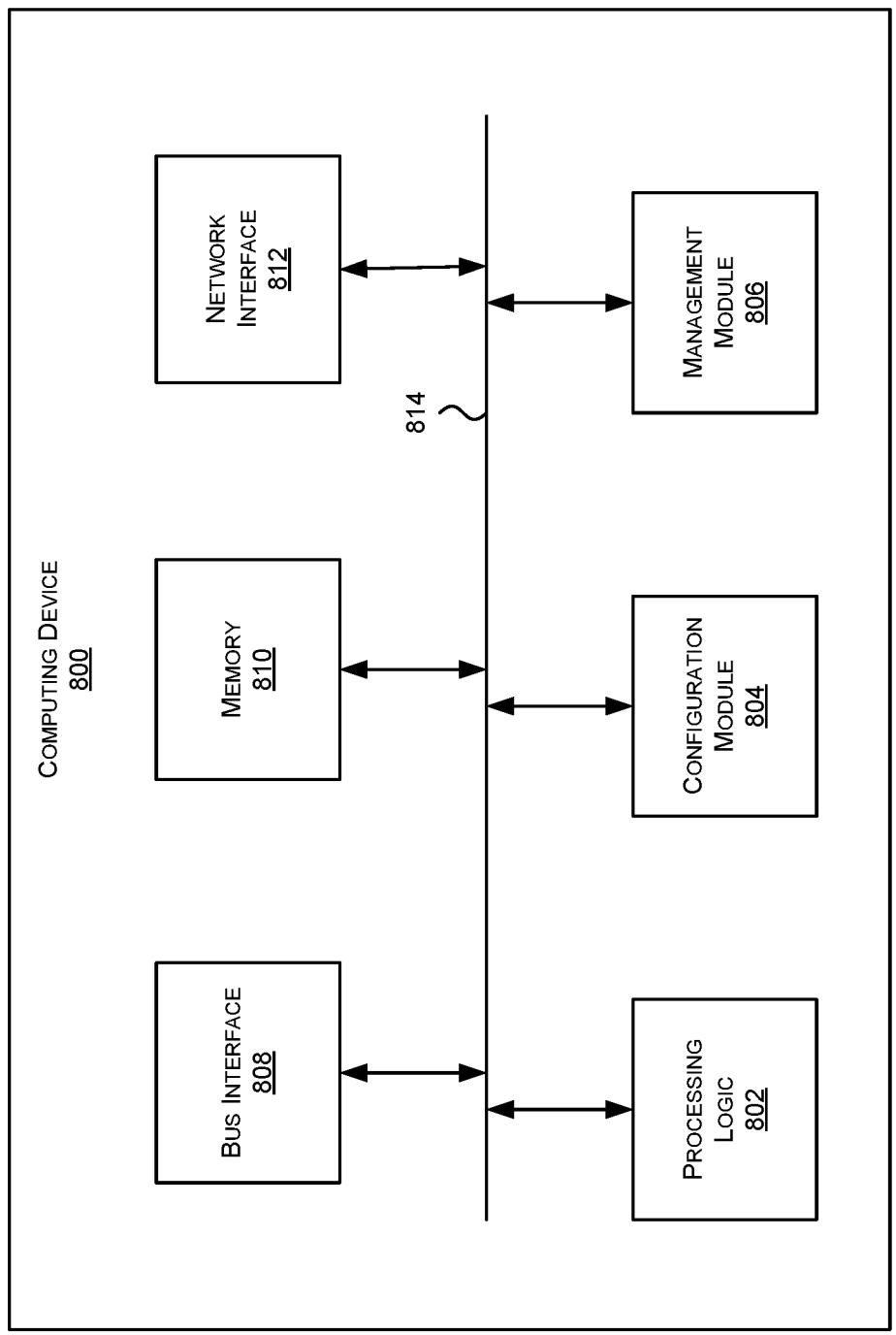
FIG. 8 illustrates an example of a computing device, according to certain aspects of the disclosure.

FIG. 8 illustrates an example of a computing device 800. Functionality and/or several components of the computing device 800 may be used without limitation with other embodiments disclosed elsewhere in this disclosure, without limitations. The computing device 800 may facilitate processing of packets and/or forwarding of packets from the computing device 800 to another device. As referred to herein, a "packet" or "network packet" may refer to a variable or fixed unit of data. In some instances, a packet may include a packet header and a packet payload. The packet header may include information associated with the packet, such as the source, destination, quality of service parameters, length, protocol, routing labels, error correction information, etc. In certain implementations, one packet header may indicate information associated with a series of packets, such as a burst transaction. In some implementations, the computing device 800 may be the recipient and/or generator of packets. In some implementations, the computing device 800 may modify the contents of the packet before forwarding the packet to another device. The computing device 800 may be a peripheral device coupled to another computer device, a switch, a router or any other suitable device enabled for receiving and forwarding packets.

In one example, the computing device 800 may include processing logic 802, a configuration module 804, a management module 806, a bus interface module 808, memory 810, and a network interface module 812. These modules may be hardware modules, software modules, or a combination of hardware and software. In certain instances, modules may be interchangeably used with components or engines, without deviating from the scope of the disclosure. The computing device 800 may include additional modules, which are not illustrated here. In some implementations, the computing device 800 may include fewer modules. In some implementations, one or more of the modules may be combined into one module. One or more of the modules may be in communication with each other over a communication channel 814. The communication channel 814 may include one or more busses, meshes, matrices, fabrics, a combination of these communication channels, or some other suitable communication channel.

The processing logic 802 may include application specific integrated circuits (ASICs), field programmable gate arrays (FPGAs), systems-on-chip (SoCs), network processing units (NPUs), processors configured to execute instructions, or any other circuitry configured to perform logical arithmetic and floating point operations. Examples of processors that may be included in the processing logic 802 may include processors developed by ARM®, MIPS®, AMD®, Qualcomm®, and the like. In certain implementations, processors may include multiple processing cores, wherein each processing core may be configured to execute instructions independently of the other processing cores. Furthermore, in certain implementations, each processor or processing core may implement multiple processing threads executing instructions on the same processor or processing core, while maintaining logical separation between the multiple processing threads. Such processing threads executing on the processor or processing core may be exposed to software as separate logical processors or processing cores. In some implementations, multiple processors, processing cores or processing threads executing on the same core may share certain resources, such as for example busses, level 1 (L1) caches, and/or level 2 (L2) caches. The instructions executed by the processing logic 802 may be stored on a computer-readable storage medium, for example, in the form of a computer program. The computer-readable storage medium may be non-transitory. In some cases, the computer-readable medium may be part of the memory 810.

The memory 810 may include either volatile or non-volatile, or both volatile and non-volatile types of memory. The memory 810 may, for example, include random access memory (RAM), read only memory (ROM), Electrically Erasable Programmable Read-Only Memory (EEPROM), flash memory, and/or some other suitable storage media. In some cases, some or all of the memory 810 may be internal to the computing device 800, while in other cases some or all of the memory may be external to the computing device 800. The memory 810 may store an operating system comprising executable instructions that, when executed by the processing logic 802, provides the execution environment for executing instructions providing networking functionality for the computing device 800. The memory may also store and maintain several data structures and routing tables for facilitating the functionality of the computing device 800.

In some implementations, the configuration module 804 may include one or more configuration registers. Configuration registers may control the operations of the computing device 800. In some implementations, one or more bits in the configuration register can represent certain capabilities of the computing device 800. Configuration registers may be programmed by instructions executing in the processing logic 802, and/or by an external entity, such as a host device, an operating system executing on a host device, and/or a remote device. The configuration module 804 may further include hardware and/or software that control the operations of the computing device 800.

In some implementations, the management module 806 may be configured to manage different components of the computing device 800. In some cases, the management module 806 may configure one or more bits in one or more configuration registers at power up, to enable or disable certain capabilities of the computing device 800. In certain implementations, the management module 806 may use processing resources from the processing logic 802. In other implementations, the management module 806 may have processing logic similar to the processing logic 802, but segmented away or implemented on a different power plane than the processing logic 802.

The bus interface module 808 may enable communication with external entities, such as a host device and/or other components in a computing system, over an external communication medium. The bus interface module 808 may include a physical interface for connecting to a cable, socket, port, or other connection to the external communication medium. The bus interface module 808 may further include hardware and/or software to manage incoming and outgoing transactions. The bus interface module 808 may implement a local bus protocol, such as Peripheral Component Interconnect (PCI) based protocols, Non-Volatile Memory Express (NVMe), Advanced Host Controller Interface (AHCI), Small Computer System Interface (SCSI), Serial Attached SCSI (SAS), Serial AT Attachment (SATA), Parallel ATA (PATA), some other standard bus protocol, or a proprietary bus protocol. The bus interface module 808 may include the physical layer for any of these bus protocols, including a connector, power management, and error handling, among other things. In some implementations, the computing device 800 may include multiple bus interface modules for communicating with multiple external entities. These multiple bus interface modules may implement the same local bus protocol, different local bus protocols, or a combination of the same and different bus protocols.

The network interface module 812 may include hardware and/or software for communicating with a network. This network interface module 812 may, for example, include physical connectors or physical ports for wired connection to a network, and/or antennas for wireless communication to a network. The network interface module 812 may further include hardware and/or software configured to implement a network protocol stack. The network interface module 812 may communicate with the network using a network protocol, such as for example TCP/IP, Infiniband, RoCE, Institute of Electrical and Electronics Engineers (IEEE) 802.11 wireless protocols, User Datagram Protocol (UDP), Asynchronous Transfer Mode (ATM), token ring, frame relay, High Level Data Link Control (HDLC), Fiber Distributed Data Interface (FDDI), and/or Point-to-Point Protocol (PPP), among others. In some implementations, the computing device 800 may include multiple network interface modules, each configured to communicate with a different network. For example, in these implementations, the computing device 800 may include a network interface module for communicating with a wired Ethernet network, a wireless 802.11 network, a cellular network, an Infiniband network, etc.

The various components and modules of the computing device 800, described above, may be implemented as discrete components, as a System on a Chip (SoC), as an ASIC, as an NPU, as an FPGA, or any combination thereof. In some embodiments, the SoC or other component may be communicatively coupled to another computing system to provide various services such as traffic monitoring, traffic shaping, computing, etc. In some embodiments of the technology, the SoC or other component may include multiple subsystems.

The modules described herein may be software modules, hardware modules or a suitable combination thereof If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 8, FIG. $$$, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A symmetric multi-processing (SMP) system comprising:
    a first system-on-a-chip (SoC) comprising:
        a source node;
        a first address decoder coupled to the source node and to a first interconnect; and
        a first set of target nodes coupled to the first interconnect; and
    a second SoC comprising:
        a second address decoder coupled to a first target node from the first set of target nodes in the first SoC, and to a second interconnect; and
        a second set of target nodes coupled to the second interconnect,
    wherein the first address decoder is configured to:
        receive a transaction from the source node with a destination address that includes a SoC address and a target node address;
        determine whether the SoC address of the destination address corresponds to the first SoC or to the second SoC based on a set of SoC decode windows;
        determine whether the source node is allowed to access the target node address of the destination address based on a set of target node decode windows; and
        upon determining that the SoC address of the destination address corresponds to the second SoC, and that the source node is allowed to access the target node address, generate a first target node identifier (ID) associated with the first target node to send the transaction to the second SoC via the first interconnect, and
    wherein the second address decoder is configured to:
        receive the transaction from the first target node;
        decode the destination address of the transaction;
        generate a second target node ID associated with a second target node in the second SoC based on the target node address; and
        send the transaction to the second target node via the second interconnect using the second target node ID.

2. The SMP system of claim 1, wherein the first address decoder is configured to terminate transactions from the source node having a target node address that the source node is not allowed to access.

3. The SMP system of claim 1, wherein the source node is a processor in the first SoC, the first target node in the first SoC corresponds to a port between the first SoC and the second SoC, and the second target node in the second SoC is a memory device.

4. The SMP system of claim 3, wherein the first target node ID is used by the first interconnect to route the transaction to the port.

5. A first address decoder in a first integrated circuit (IC), comprising:
    a target node decoder configured with a set of target node decode windows; and
    an IC decoder configured with a set of IC decode windows,
    wherein the first address decoder is configured to:
        receive a first transaction from a source node with a first destination address that includes an IC address and a target node address;
        determine, using the IC decoder, that the IC address of the first destination address corresponds to a second IC;
        determine, using the target node decoder, that the source node is allowed to access the target node address of the first destination address; and
        upon determining that the IC address of the first destination address corresponds to the second IC, and that the source node is allowed to access the target node address, allow the first transaction to be sent to the second IC via a first interconnect.

6. The first address decoder of claim 5, wherein the first address decoder is further configured to:
    receive a second transaction from the source node with a second destination address;
    determine, using the IC decoder, that an IC address of the second destination address corresponds to the second IC;
    determine, using the target node decoder, that the source node is not allowed to access a target node address of the second destination address; and
    upon determining that the IC address of the second destination address corresponds to the second IC, and that the source node is not allowed to access the target node address of the second destination address, terminate the second transaction at the first IC without sending the second transaction to the second IC.

7. The first address decoder of claim 5, wherein allowing the first transaction to be sent to the second IC includes generating a first target node ID, the first target node ID used by the first interconnect to route the first transaction to a local target node coupled to the first interconnect, wherein the local target node is configured to communicate with the second IC.

8. The first address decoder of claim 5, wherein first address decoder is further configured to:
receive a second transaction from the source node with a second destination address;
determine, using the IC decoder, that an IC address of the second destination address corresponds to the first IC;
determine, using the target node decoder, that the source node is allowed to access a target node address of the second destination address; and
upon determining that the IC address of the second destination address corresponds to the first IC, and that the source node is allowed to access the target node address of the second destination address, allow the second transaction to be sent to a first target node corresponding to the target node address in the first IC via the first interconnect.

9. The first address decoder of claim 5, wherein the first address decoder is further configured to:
receive a second transaction from the source node with a second destination address;
determine, using the IC decoder, that an IC address of the second destination address corresponds to the first IC;
determine, using the target node decoder, that the source node is not allowed to access a target node address of the second destination address; and
upon determining that the IC address of the second destination address corresponds to the first IC, and that the source node is not allowed to access the target node address of the second destination address, terminate the second transaction at the first IC.

10. The first address decoder of claim 5, wherein the first IC is a first system-on-a-chip (SoC) and the second IC is a second SoC from a plurality of SoCs in a system, and the set of IC decode windows includes a mapping of each SoC of the system to a corresponding address range.

11. The first address decoder of claim 5, wherein the set of target node decode windows includes, for each target node of a plurality of target nodes in the first IC, a corresponding start address of the target node, a window size, a first bit indicating whether the source node is allowed to access a given target node in the first IC, and a second bit indicating whether the source node is allowed to access the given target node in the second IC.

12. The first address decoder of claim 7, wherein a second address decoder in the second IC is configured to:
receive the first transaction from the local target node in the first IC;
decode the first destination address of the first transaction; and
generate a second target node ID associated with a target node in the second IC based on the target node address, wherein the second target node ID is used by a second interconnect in the second IC to route the first transaction to the target node in the second IC.

13. The first address decoder of claim 11, wherein a same set of target node decode windows are used in both the first IC and the second IC.

14. The first address decoder of claim 13, wherein the source node is allowed to access a same set of target nodes from the plurality of target nodes in both the first IC and the second IC.

15. The first address decoder of claim 13, wherein the source node is allowed to access different sets of target nodes from the plurality of target nodes in the first IC and the second IC.

16. A computer-implemented method performed by a first address decoder in a first system-on-a-chip (SoC), comprising:
receiving a first transaction from a source node with a first destination address that includes a SoC address and a target node address;
determining that the SoC address of the first destination address corresponds to a second SoC based on a set of SoC decode windows;
determining that the source node is allowed to access the target node address of the first destination address based on a set of target node decode windows; and
upon determining that the SoC address of the first destination address corresponds to the second SoC, and that the source node is allowed to access the target node address, generating a first target node identifier (ID) to send the first transaction to the second SoC via a first interconnect.

17. The computer-implemented method of claim 16, further comprising:
receiving a second transaction from the source node with a second destination address;
determining, using the set of SoC decode windows, that a SoC address of the second destination address corresponds to the second SoC;
determining, using the set of target node decode windows, that the source node is not allowed to access a target node address of the second destination address; and
upon determining that the SoC address of the second destination address corresponds to the second SoC, and that the source node is not allowed to access the target node address of the second destination address, terminating the second transaction at the first SoC without sending the second transaction to the second SoC.

18. The computer-implemented method of claim 16, further comprising:
receiving a second transaction from the source node with a second destination address;
determining, using the set of SoC decode windows, that a SoC address of the second destination address corresponds to the first SoC;
determining, using the set of target node decode windows, that the source node is allowed to access a target node address of the second destination address; and
upon determining that the SoC address of the second destination address corresponds to the first SoC, and that the source node is allowed to access the target node address, generating a second target node identifier (ID) corresponding to the target node address to send the second transaction to a first target node in the first SoC via the first interconnect.

19. The computer-implemented method of claim 16, wherein the target node ID is associated with a local target node coupled to the first interconnect, the local target node configured to communicate with the second SoC, and wherein a second address decoder in the second SoC sends the first transaction to a target node in the second SoC based on the first destination address.

20. The computer-implemented method of claim 16, wherein determining that the SoC address of the first destination address corresponds to the second SoC is performed in parallel with determining that the source node is allowed to access the target node address of the first destination address.

\* \* \* \* \*